United States Patent [19]

Hasegawa et al.

[11] Patent Number: 4,715,225

[45] Date of Patent: Dec. 29, 1987

[54] FLOW METER FOR MEASURING THE FLOW RATE OF LIQUID

[75] Inventors: Yoshihiko Hasegawa; Osamu Miyata, both of Hyogo, Japan

[73] Assignee: TLV Co., Ltd., Tokyo, Japan

[21] Appl. No.: 759,077

[22] Filed: Jul. 25, 1985

[30] Foreign Application Priority Data

Aug. 9, 1984 [JP] Japan .............................. 59-167410

[51] Int. Cl.$^4$ ............................................... G01F 1/20
[52] U.S. Cl. ....................................................... 73/215
[58] Field of Search .................................. 73/215, 216

[56] References Cited

U.S. PATENT DOCUMENTS

| | | | |
|---|---|---|---|
| 1,138,700 | 5/1915 | Sutro | 73/215 |
| 1,243,682 | 10/1917 | Bailey | 73/215 |
| 1,372,138 | 3/1921 | Herschel | 73/215 |
| 1,505,050 | 8/1924 | Lauritsen | 73/215 |
| 4,213,336 | 7/1980 | Schweickart | 73/215 |

Primary Examiner—Herbert Goldstein
Attorney, Agent, or Firm—Toren, McGeady & Associates

[57] ABSTRACT

A flow meter for measuring the flow rate of a liquid, capable of detecting the liquid level in the upstream space with respect to a weir and determining the flow rate of the liquid on the basis of the relationship between the liquid level and the flow rate of the liquid that flows through the weir, wherein the width of the weir is designed so that the ratio of the variation of the flow rate caused by a fixed variation in the liquid level to the total flow rate at the existing liquid level is constant regardless of the liquid level.

6 Claims, 2 Drawing Figures

FLOW METER FOR MEASURING THE FLOW RATE OF LIQUID

The present invention relates to a flow meter for measuring the flow rate of a liquid.

The flow rate of a liquid can be determined by measuring the level of the liquid on the upstream side of a weir, provided that the relationship between the liquid level on the upstream side of the weir and the flow rate of the liquid through the weir at the existing liquid level is known. The present invention relates particularly to the construction of a flow meter equipped with such a weir.

In devices of this type, although condensation evaporates again when the pressure changes, condensation flows through the weir without evaporating, because the same pressure prevails in the space on the upstream side of the weir and in the space downstream of the weir. Therefore, the flow meter of the present invention is useful particularly for measuring the condensation in steam piping.

The concept of the present invention derives from efforts directed toward the development of a flow meter employing a so-called proportional weir in which the flow rate of the liquid is proportional to the liquid level on the upstream side of the weir. The interior space of the casing of this flow meter is partitioned by a vertical wall into an upstream space having an inlet formed in the upper part of the same and connecting to the measured system, and a downstream space having a liquid discharge port formed in the lower part of the same, the upstream space and the downstream space communicating with each other by means of a space above the partition wall. A float valve capable of automatically discharging the liquid is provided at the liquid discharging port, and the liquid level in the upstream space is measured with a float or the like. Since the flow rate of a liquid that flows through an orifice is proportional to the square root of the distance from the liquid surface to the orifice, the proportional weir is a vertically elongated slit decreasing upward in width.

The flow rate measuring accuracy of the aforementioned proportional weir reduces with decreases in the flow rate because the measuring error in measuring the liquid level in the upstream space is caused by the turbulence of the liquid surface and/or the resistance between the contact surfaces of the sliding members of a mechanism for converting the displacement of the float into a corresponding electric signal and those factors causative of the measuring error are constant regardless of the liquid level. Hence, the degree of influence of those factors causative of the measuring error on the measuring accuracy is enhanced as the flow rate decreases.

Accordingly, the present invention is directed to providing a so-called constant-accuracy weir in which the ratio of the variation of the flow rate to the variation of liquid level is reduced as the flow rate decreases and, thereby, the flow rate can be measured with constant measuring accuracy regardless of the liquid level by taking into account the fact that the liquid level measuring error is practically constant regardless of the liquid level.

SUMMARY OF THE INVENTION

Briefly, the present invention may be described as a flow meter assembly for measuring the flow rate of a liquid comprising a weir arranged to have said liquid flow therethrough and defining an upstream space on one side thereof, the flow meter being capable of detecting the liquid level in the upstream space with respect to the weir and determining the flow rate of the liquid on the basis of the relationship between the liquid level and the flow rate of the liquid that flows through the weir. In accordance with the present invention, the width of the weir is designed so that the ratio of the variation of flow rate caused by a fixed variation in the liquid level to the total flow rate at the existing liquid level is constant regardless of the liquid level.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
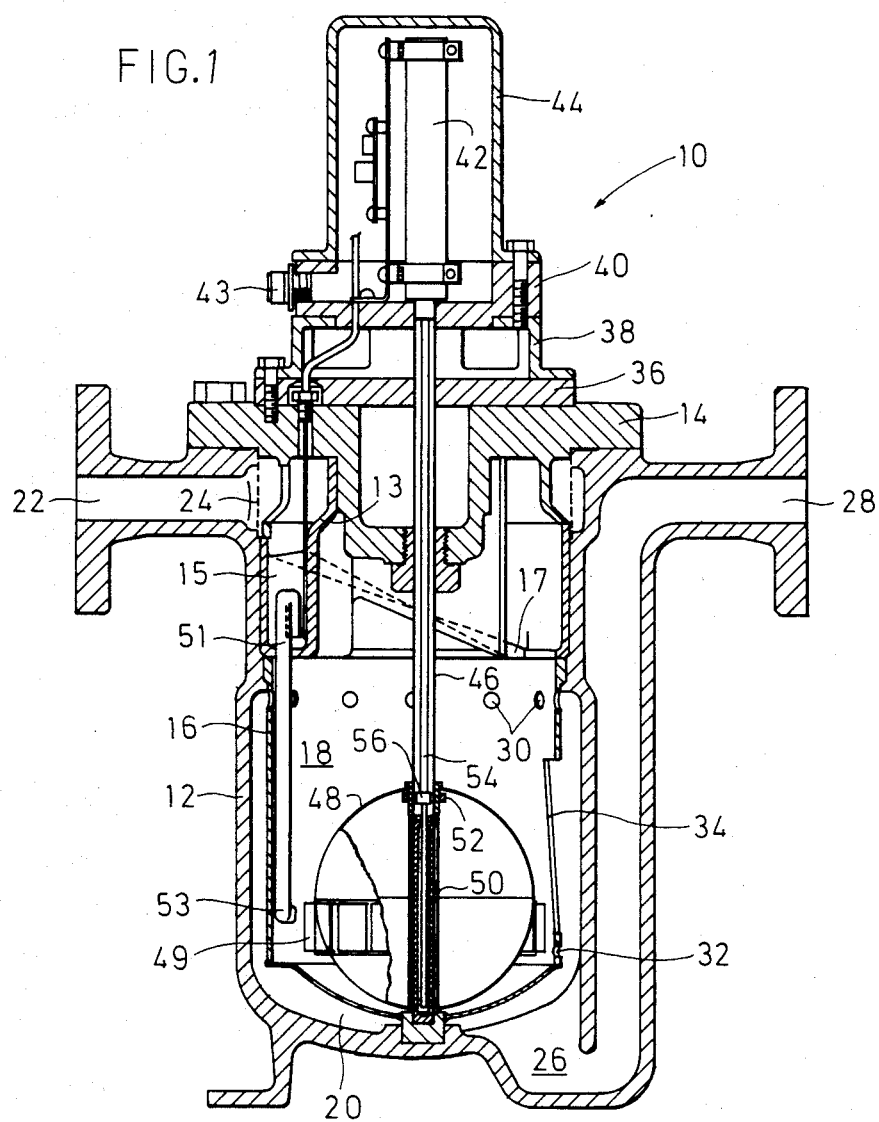
FIG. 1 is a sectional view of the detecting unit of a flow meter according to a preferred embodiment of the present invention.

Referring now to the drawings, a preferred embodiment of the present invention will be hereinafter described in connection with FIGS. 1 and 2.

The detecting unit 10 of a flow meter has a casing consisting of a body 12 and a cover 14 fixed to the body 12 with bolts. A cup-shaped partition member 16 is disposed within the casing. The interior of the partition member 16 and a space extending above the partition member 16 form an upstream space 18, while the exterior of the partition member 16 and a space extending below the partition member 16 form a downstream space 20.

An inlet 22 to be connected to a measured system communicates with the upper part of the upstream space 18 through a cylindrical screen 24, a liquid sump 15 formed by the member 13 and the introducing channel 17. A liquid discharging port 26 is formed in the lower part of the downstream space 20. The liquid discharging port 26 communicates with an outlet 28 by means of an upright passage.

The upstream space 18 and the downstream space 20 communicate by means of through holes 30 formed in the partition member 16 at the upper end thereof. In use, an automatic discharge valve, such as a float valve (not shown) is provided at the outlet 28 to maintain the downstream space 20 at the same pressure as that of the upstream space 18. The partition member 16 is provided further with an orifice 32 and a weir 34 in the surrounding wall thereof.

The shape of the weir 34 is decided first by specifying values for the flow rate measuring accuracy and the flow rate at a liquid level corresponding to the bottom of the weir, secondly, by designing an orifice which provides the specified flow rate at a liquid level corresponding to the bottom of the weir and a flow rate measuring accuracy not greater than the specified value, and thirdly, assuming that the weir is formed by piling a plurality having rectangular orifices, each of a constant height, one over the other, by deciding the respective widths of the rectangular orifices so that the ratio of an increment of flow rate given by placing a minute rectangular orifice to the total flow rate at the level is constant.

An exemplary procedure for designing the weir 34 will be hereinafter described. Suppose that the flow rate measuring accuracy is 2%, the diameter of the orifice 32 is 5 mm, and the distance from the orifice to the lower end of the weir is 12.4 mm, water then flows out through the orifice 32 at a flow rate of 20.91 kg/hr when the liquid level coincides with the bottom of the weir 34. The calculated values for the height (mm) of the weir 34 (the height of the liquid level from the bottom of the weir 34), the width (mm) of the weir, and the flow rate (kg/hr) are tabulated in Table I.

TABLE I

| HEIGHT (mm) | WIDTH (mm) | FLOW RATE (kg/hr) |
|---|---|---|
| 1 | 0.23 | 21.75 |
| 2 | 0.34 | 22.63 |
| 3 | 0.42 | 23.55 |
| 4 | 0.49 | 24.50 |
| 5 | 0.55 | 25.49 |
| 10 | 0.80 | 31.07 |
| 20 | 1.30 | 46.17 |
| 30 | 1.97 | 68.60 |
| 40 | 2.95 | 101.94 |
| 50 | 4.40 | 151.47 |
| 60 | 6.55 | 225.08 |
| 70 | 9.73 | 334.45 |
| 80 | 14.47 | 496.97 |
| 90 | 21.50 | 738.48 |
| 100 | 31.95 | 1097.33 |

Figure 2:
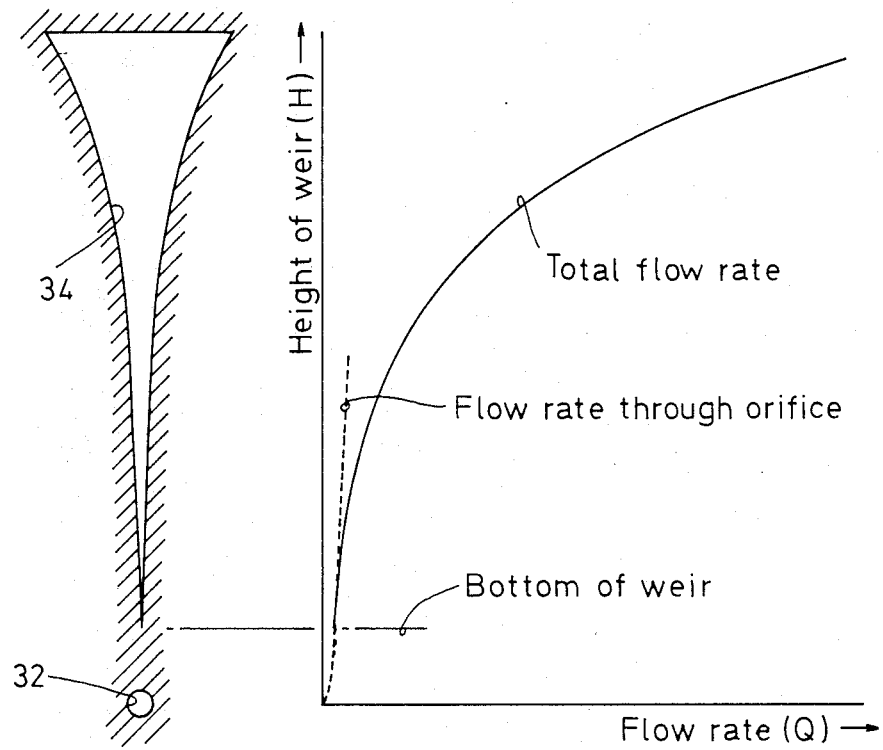
FIG. 2 is an end view of an exemplary weir according to the present invention and a graph showing the relationship between the height of the liquid level at the weir and the flow rate.

FIG. 2 shows the respective shapes of the orifice 32 and the weir 34 decided on the basis of the data of Table I and a graph showing the plot of the data of Table I in relation to the flow rate (Q) to the height (H) of the weir 34. Reference numeral 43 identifies a connector for wiring.

An insulation plate 36 and supporting members 38, 40 are mounted on top of the cover 14. A potentiometer 42 is disposed at the center of the supporting member 40. The potentiometer 42 is covered with a protective cap 44. Electric wiring and terminals (not shown) are provided within the protective cap 44.

A pipe 46 of a thin wall construction is extended downwardly from the potentiometer so as to penetrate through the cover 14 hermetically and to reach the central part of the bottom of the partition member 16. A pipe 50 penetrating through and fixed to a hollow spherical float 48 is fitted slidably on the pipe 46. Magnets 52 and 56 are attached to the pipe 50 of the float 48 and the actuator rod 54 of the potentiometer 42, respectively.

The float 48 is provided with vanes 49. An inverted U-tube 51 is arranged at the liquid sump 15, extending downwardly. One end of the U-tube 53 reaches the level of the vanes 49 when the float 48 rests at the bottom and is directed tangentially.

The liquid level is measured in the following manner. The float 48 rises and falls according to the variation in the liquid level in the upstream space 18. The actuator rod 54 is then displaced according to the movement of the float 48 by the interactions of the magnets 52 and 56. The displacement of the actuator rod 54 is converted into a corresponding electric signal by the potentiometer 42. Thus, the liquid level in the upstream space 18 is indicated by an electric signal.

If the flow rate is small, liquid from the inlet 22 is accumulated in the sump 15, flows down intermittently through the inverted U-tube 51 and strikes the vanes 49 to rotate the float 48. If the flow rate is large, liquid also flows through the introducing channel 17 into the upstream space 18 tangentially around the float 48 to rotate the liquid therein. Since the float 48 accordingly rotates, the float 48 can move up and down smoothly, depending upon the liquid level.

Of course, the flow meter requires parts for calculating the flow rate on the basis of the liquid level detected in the above-mentioned manner and for displaying the calculated result. However, since those parts are well known in the art and are within the knowledge of a skilled artisan, a more detailed description thereof is omitted here.

Thus, it will be seen that the technical improvements of the present invention operate to solve the above-mentioned technical problems of the prior art by providing a weir of a shape designed so that the ratio of the variation in the flow rate caused by a fixed variation of the liquid level to the total flow rate at the existing liquid level is constant regardless of the liquid level.

The width of the weir is decided through numerical calculations, whereby, first, values for the flow rate measuring accuracy and the flow rate at a liquid level corresponding to the bottom of the weir are specified. Secondly, an orifice which provides the specified flow rate at the liquid level corresponding to the bottom of the weir and a flow rate measuring accuracy not greater than the specified value is designed. Thirdly, assuming that the weir consists of a plurality of rectangular orifices, each of a fixed minute height, arranged one over the other, the respective widths of the rectangular orifices are decided so that the ratio of an increment of flow rate given by placing a rectangular orifice to the total flow rate coincides with the specified flow rate measuring accuracy.

In the operation of the flow meter in accordance with the invention, liquid flows through the inlet 22 into the upstream space 18 defined by a partition wall, then flows through the orifice 32 and the weir 34 into the downstream space, and then flows outside through the outlet 28. Since the relationship between the liquid level in the upstream space and the flow rate at the weir is known, the flow rate at the weir is obtained on the basis of the measured liquid level.

The ratio of the increment or decrement of the flow rate for a fixed variation of the liquid level to the total flow rate is constant and coincides with the specified measuring accuracy as far as the range in the variation of the liquid level in the upstream space is within the height of the weir. On the other hand, the liquid level measuring error is practically constant as in the conventional liquid level measurement, regardless of the liquid level. Accordingly, the flow rate measuring accuracy is constant regardless of the liquid level.

Pursuant to the characteristic effects of the present invention, since the flow rate measuring accuracy of the flow meter of the present invention is constant regardless of the liquid level, the flow meter of the present invention is capable of accurately measuring the flow rate regardless of the flow rate or the variation of the flow rate.

In a constant-accuracy weir employed in the present invention, the flow rate varies as an exponential function of the liquid level, therefore, the constant-accuracy weir has a flow rate measuring range far wider than that of a conventional proportional weir of the same height.

While a specific embodiment of the present invention has been shown and described in detail to illustrate the application of the inventive principles, it will be understood that the present invention may be embodied otherwise without departing from such principles.

What is claimed is:

1. A flow meter for measuring the flow rate of a liquid comprising a vertically elongated slit weir arranged to have said liquid flow therethrough and defining an upstream space on one side thereof, said flow meter being capable of detecting the liquid level in said upstream space with respect to said weir and determining the flow rate of the liquid on the basis of the relationship between said liquid level and the flow rate of the liquid that flows through the weir, wherein a width of said weir is designed so that a constant percentage variation in total flow rate causes a constant variation in liquid level at any liquid level.

2. A flow meter according to claim 1, wherein said weir comprises a vertically elongated slit upwardly increasing in width.

3. A flow meter according to claim 2, wherein said weir has a lower section tapering to a lower end at which flow through said weir terminates and wherein said flow meter further comprises an orifice through which liquid flow occurs, said orifice having a predetermined diameter and being spaced a predetermined distance from said lower end of said weir, said predetermined distance and said predetermined diameter being determined to provide a desired flow rate when the liquid level in said upstream space is at or below said lower end of said weir.

4. A flow meter according to claim 3 having a flow rate measuring accuracy of 2%, wherein said predetermined diameter of said orifice is 5 mm, wherein said predetermined distance is 12.4 mm and wherein the flow rate through said orifice is 20.91 kg/hr when the liquid level coincides with said lower end of said weir.

5. A flow meter according to claim 3, wherein said weir comprises a specific width dimension at each level of height above said lower end thereof, in accordance with the following table wherein Column I sets forth each height dimension and Column II sets forth the corresponding width dimension with the flow rate for a liquid level at each of the height dimensions set forth in Column 1 being indicated in Column III

| I<br>HEIGHT<br>(mm) | II<br>WIDTH<br>(mm) | III<br>FLOW RATE<br>(kg/hr) |
|---|---|---|
| 1 | 0.23 | 21.75 |
| 2 | 0.34 | 22.63 |
| 3 | 0.42 | 23.55 |
| 4 | 0.49 | 24.50 |
| 5 | 0.55 | 25.49 |
| 10 | 0.80 | 31.07 |
| 20 | 1.30 | 46.17 |
| 30 | 1.97 | 68.60 |
| 40 | 2.95 | 101.94 |
| 50 | 4.40 | 151.47 |
| 60 | 6.55 | 225.08 |
| 70 | 9.73 | 334.45 |
| 80 | 14.47 | 496.97 |
| 90 | 21.50 | 738.48 |
| 100 | 31.95 | 1097.33. |

6. A method for forming the shape of a weir in a flow meter for measuring the flow rate of a liquid having said weir arranged therein and defining an upstream space on one side of said weir, said weir being shaped as a vertically elongated slit having a lower section tapering to a lower end to which flow through said weir terminates, with said flow meter further comprising an orifice through which liquid flow occurs, said orifice having a predetermined diameter and being spaced a predetermined distance from said lower end of said weir, said method comprising the steps of specifying values for the flow rate measuring accuracy of said meter and the flow rate at a liquid level corresponding to said lower end of said weir, designing said orifice to provide said specified flow rate at a liquid level corresponding to said lower end of said weir and a flow rate measuring accuracy not greater than said specified value and, assuming that said weir consists of a plurality of rectangular orifices, each of a fixed minute height arranged one over the other, determining the respective widths of said rectangular orifices so that a given ratio of an incremental change of flow rate to the total flow rate produces a constant change in level at any liquid level.

* * * * *